US011313349B2

(12) United States Patent
McCrudden

(10) Patent No.: US 11,313,349 B2
(45) Date of Patent: Apr. 26, 2022

(54) VERTICAL AXIS WIND TURBINE

(71) Applicant: Stephen McCrudden, Mississauga (CA)

(72) Inventor: Stephen McCrudden, Mississauga (CA)

( * ) Notice: Subject to any disclaimer, the term of this patent is extended or adjusted under 35 U.S.C. 154(b) by 605 days.

(21) Appl. No.: 15/445,100

(22) Filed: Feb. 28, 2017

(65) Prior Publication Data

US 2017/0248119 A1  Aug. 31, 2017

Related U.S. Application Data

(60) Provisional application No. 62/301,240, filed on Feb. 29, 2016.

(51) Int. Cl.
*F03D 3/06* (2006.01)
*F03D 3/00* (2006.01)
*F03D 3/02* (2006.01)

(52) U.S. Cl.
CPC ............ *F03D 3/067* (2013.01); *F03D 3/005* (2013.01); *F03D 3/02* (2013.01); *F05B 2240/218* (2013.01); *Y02E 10/74* (2013.01)

(58) Field of Classification Search
CPC .......... Y02E 10/74; F03B 17/062; F03B 3/14; F03B 3/145; F03B 3/02; F05B 2240/211; F05B 2240/217; F05B 2240/218; F05B 2260/74; F03D 3/005; F03D 3/067
See application file for complete search history.

(56) References Cited

U.S. PATENT DOCUMENTS

| 185,924 | A | * | 1/1877 | Howland | F03D 3/00 416/117 |
| 1,148,989 | A | * | 8/1915 | Reese | 416/117 |
| 1,963,196 | A | * | 6/1934 | Frisch | F03D 3/0472 416/44 |
| 4,045,148 | A | * | 8/1977 | Morin | F03B 17/065 416/84 |
| 4,822,239 | A | * | 4/1989 | Tsipov | F03D 3/0463 415/125 |
| 5,570,997 | A | * | 11/1996 | Pratt | F03D 3/067 416/117 |

(Continued)

FOREIGN PATENT DOCUMENTS

EP  1887220 A2 *  2/2008  ............... F03D 3/02
WO  2010/085019 A1  7/2010

*Primary Examiner* — Nathan C Zollinger
(74) *Attorney, Agent, or Firm* — Bereskin & Parr LLP/S.E.N.C.R.L., s.r.l.; Isis E. Caulder; T. Cameron Gale

(57) ABSTRACT

A vertical axis wind turbine rotor with a base having a rotational centre, a top surface, a top surface edge, and a plurality of top plates disposed radially around the rotational centre. The rotational centre defines an axis of rotation substantially orthogonal to the top surface. The top surface extends radially from the rotational centre to the top surface edge. Each of the top plates has a leading edge coupled to the base. Each top plate is passively transitionable between a first position above at a first height, and a second position above the top surface at second height. The rotor may also have a bottom surface with a plurality of bottom plates coupled thereto and disposed radially around the rotational centre. The bottom plates can be passively transitionable between a raised position and lowered position.

20 Claims, 8 Drawing Sheets

(56) References Cited

U.S. PATENT DOCUMENTS

| | | | |
|---|---|---|---|
| 7,445,420 B2 | 11/2008 | Yoshida | |
| 8,314,508 B2 | 11/2012 | Kawas et al. | |
| 8,487,468 B2 * | 7/2013 | Christopher | F03B 3/121 |
| | | | 290/54 |
| 8,899,937 B2 * | 12/2014 | Graham | F03D 7/0268 |
| | | | 416/231 R |
| 9,752,557 B2 * | 9/2017 | Nicklas | F03D 7/06 |
| 9,874,197 B2 * | 1/2018 | Christopher | F03B 17/063 |
| 2008/0007067 A1 | 1/2008 | Ryu et al. | |
| 2017/0298901 A1 * | 10/2017 | Havas | F03D 3/0409 |

* cited by examiner

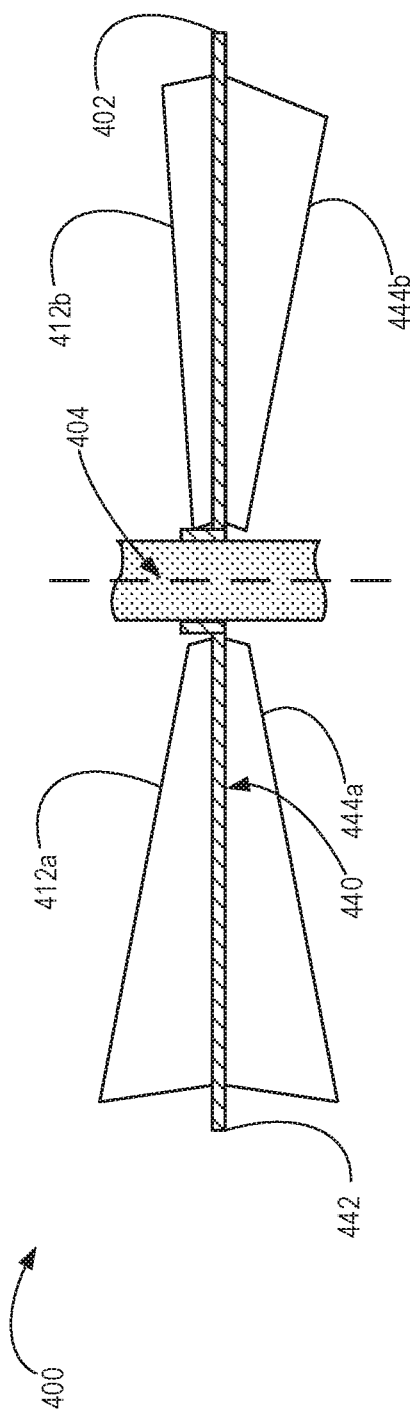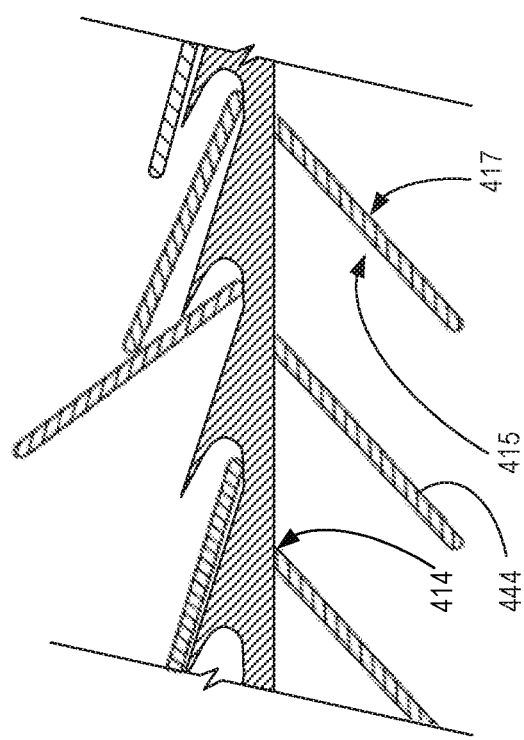

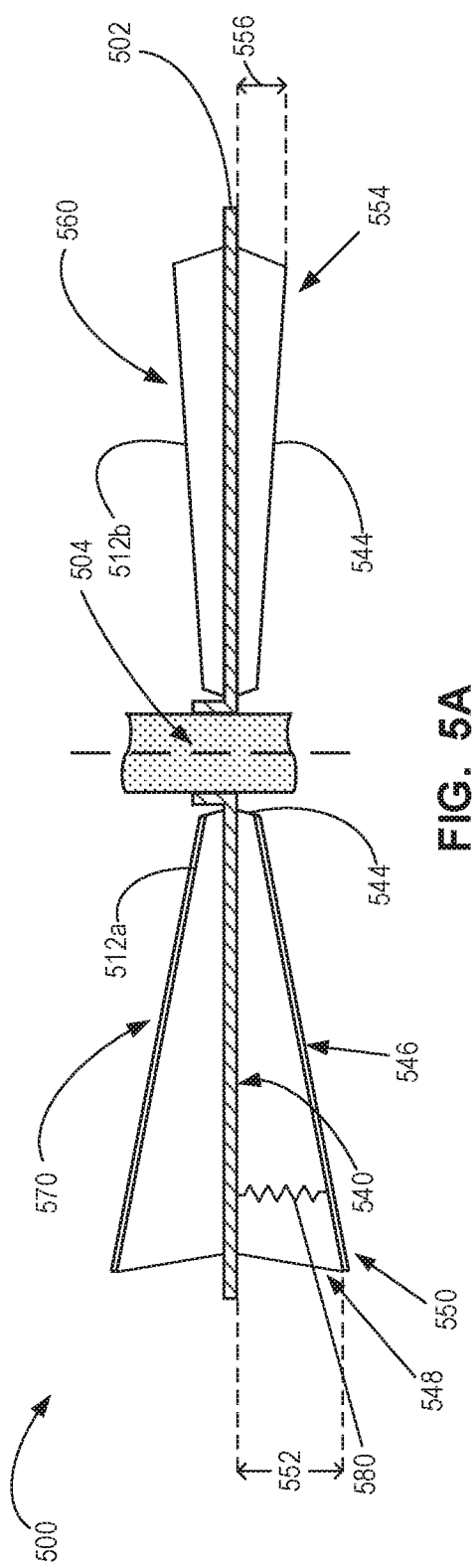
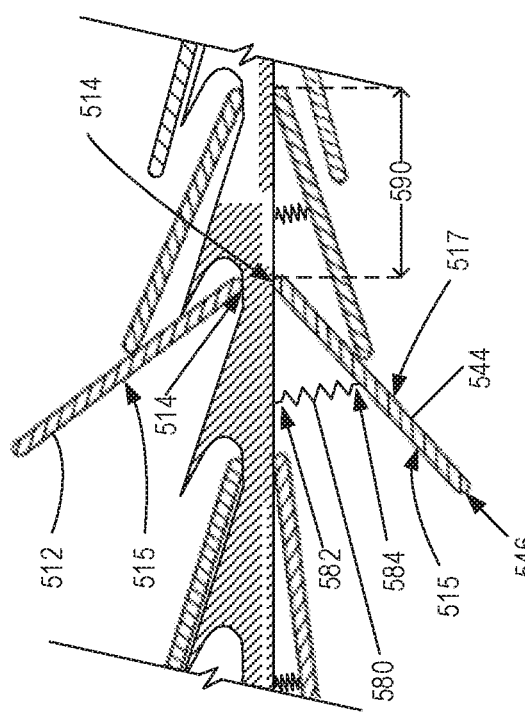
FIG. 5A
FIG. 5B

VERTICAL AXIS WIND TURBINE

CROSS-REFERENCE TO RELATED APPLICATION

This application claims the benefit of U.S. Provisional Application No. 62/301,240, filed Feb. 29, 2016, the entirety of which is incorporated herein by reference in its entirety.

FIELD

The present invention relates generally to wind turbines, and in particular vertical axis wind turbines.

INTRODUCTION

The following paragraphs are not an admission that anything discussed in them is prior art or part of the knowledge of persons skilled in the art.

Renewable energy sources are sources of energy that can be replenished in much shorter periods than non-renewable energy sources such as oil, gas, and coal. In order to reduce human reliance on non-renewable energy sources, improved technologies for generating power from renewable energy sources are continually being explored. However, the adoption and proliferation of renewable energy sources may be slowed by various barrier factors. One such barrier factor may be low and/or unpredictable levels of power generation associated with some renewable energy sources. The costs and complexity associated with installing new power generating devices also act as barriers against the adoption of some renewable energy sources.

Wind turbines can be used capture kinetic energy from wind. Wind turbines may convert captured kinetic energy into mechanical and/or electrical power. Vertical axis wind turbines are a type of wind turbine where the main rotor shaft is set transverse to the wind, usually vertically. The kinetic energy of incident wind can be captured by wind catchment devices and converted into rotational energy that drives the rotor shaft. The rotor shaft may then be used to convert the rotational energy into electricity using a generator.

In vertical axis wind turbines, the catchment devices may experience two phases of rotation. In the first phase, a wind catchment device moves with the wind, translating at least partly in the same direction as the incident wind. In this first phase, the kinetic energy of the incident wind can be captured and converted into rotational energy that drives the rotor shaft. In the second phase, the wind catchment device moves against the wind, translating at least partly in a direction opposite to the direction of the incident wind. As a result, the rotation of the rotor shaft may be slowed by drag on wind catchment devices travelling through the second phase of rotation. This drag force may reduce the net rotational energy captured by the rotor (i.e. by slowing rotation of the rotor shaft) and thereby reduce the amount of electrical power that can be generated.

To increase the power generation capabilities of a vertical axis wind turbine, it may be desirable to maximize the rotational energy transferred to the rotor shaft. Accordingly, it may be desirable for a vertical axis wind turbine to minimize the drag experienced by wind catchment devices as they move against the wind. Similarly, it may be desirable to maximize the incident wind energy that can be captured by wind catchment devices moving with the wind. At the same time, simpler and less expensive vertical axis wind turbines may facilitate the adoption and proliferation of such wind turbines.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In an aspect, there is provided a vertical axis wind turbine rotor having a base with a rotational centre, a top surface, a top surface edge, and a plurality of top plates disposed radially around the rotational centre. The top surface extends radially from the rotational centre to the top surface edge, and the rotational centre defines an axis of rotation substantially orthogonal to the top surface. Each top plate has a leading edge and is coupled to the base along the leading edge. Each top plate is transitionable between a first position in which the top plate extends above the top surface to a first height, and a second position in which the top plate extends above the top surface to a second height, where the second height is less than the first height.

In some embodiments the base includes a plurality of recesses, and each of the top plates has a recessing portion that is recessed in one of the recesses when the top plate is in the second position.

In some embodiments, the rotor includes a plurality of rotation limiters, each rotation limiter corresponding to one of the top plates and defining a maximum height for the first height of the corresponding top plate when the corresponding top plate is in the first position.

In some embodiments, each top plate has an end portion distal from the rotational centre, the end portion coupled to the top surface, and the rotation limiter is provided by the end portion. In some embodiments, the rotation limiter is a textile. In some embodiments, the rotation limiter is a string.

In some embodiments, each of the recesses has a limiter surface, and for each top plate, the rotation limiter corresponding to that top plate includes the limiter surface of a recess adjacent to the recess into which the recessing portion of that top plate is recessed when the top plate is in the second position, the limiter surface positioned to contact that top plate when that top plate is in the first position to prevent the top plate from transitioning beyond the maximum height.

In some embodiments, each top plate overlies the leading edge of an adjacent top plate when in the second position.

In some embodiments, each top plate is passively transitionable between the first position and the second position.

In some embodiments, the base has a bottom surface, a bottom surface edge, and a plurality of bottom plates disposed radially around the rotational centre. The bottom surface extends radially from the rotational centre to the bottom surface edge, and each bottom plate has a bottom leading edge and is coupled along the leading edge to the base.

In some embodiments, each top plate further comprises at least one window portion that permits fluid to flow therethrough.

In an aspect there is provided a vertical axis wind turbine rotor with a base having a rotational centre, a bottom surface, a bottom surface edge, and a plurality of bottom plates disposed radially around the rotational centre. The bottom surface extends radially from the rotational centre to the bottom surface edge, and the rotational centre defines an axis of rotation substantially orthogonal to the bottom surface. Each bottom plate having a bottom leading edge and being coupled along the leading edge to the base.

In some embodiments, each of the bottom plates is transitionable between a lowered position in which the bottom plate extends below the bottom surface to a first depth, and a raised position in which the bottom plate extends below the bottom surface to a second depth, the second depth being less than the first depth.

In some embodiments, the rotor includes a plurality of lifters, each lifter corresponding to one of the bottom plates, and each lifter is coupled to the base and to the bottom plate corresponding to that lifter. Each bottom plate is maintainable in the raised position by the corresponding lifter.

In some embodiments, each lifter is a spring.

In some embodiments, each of the bottom plates has a trailing edge, each lifter is coupled to the base at a central attachment region and at an outer attachment region proximate the bottom surface edge, and each lifter is coupled to the bottom plate corresponding to that lifter at a lifter attachment region between the central attachment region and the outer attachment region, the lifter attachment region displaced inwardly from the outer attachment region.

In some embodiments, the spring has a selected stiffness, the stiffness selected such that, when the rotor is positioned with the bottom surface in a downward facing orientation, wind incident upon one of the bottom plates will transition the bottom plate from the raised position to the lowered position. In some embodiments, the stiffness is selected such that, when the rotor is positioned with the second surface in the downward facing orientation, the lower plate is returned by the spring to the raised position in the absence of incident wind.

In some embodiments, each of the bottom plates is passively transitionable between the lowered position and the raised position.

In an aspect there is provided a vertical axis wind turbine including a central shaft and a plurality of rotors coupled to the central shaft, wherein the rotors are described herein.

Further aspects and advantages of the embodiments described herein will appear from the following description taken together with the accompanying drawings.

BRIEF DESCRIPTION OF THE DRAWINGS

For a better understanding of the described embodiments and to show more clearly how they may be carried into effect, reference will now be made, by way of example, to the accompanying drawings in which:

FIG. 4A is a section view of a simplified schematic of another example wind turbine structure;

FIG. 4B is partial section view of an example simplified schematic of the wind turbine structure of FIG. 4A;

FIG. 5A is a section view of a simplified schematic of a further example wind turbine structure;

FIG. 5B is partial section view of an example simplified schematic of the wind turbine structure of FIG. 5A;

DETAILED DESCRIPTION

Figure 1:
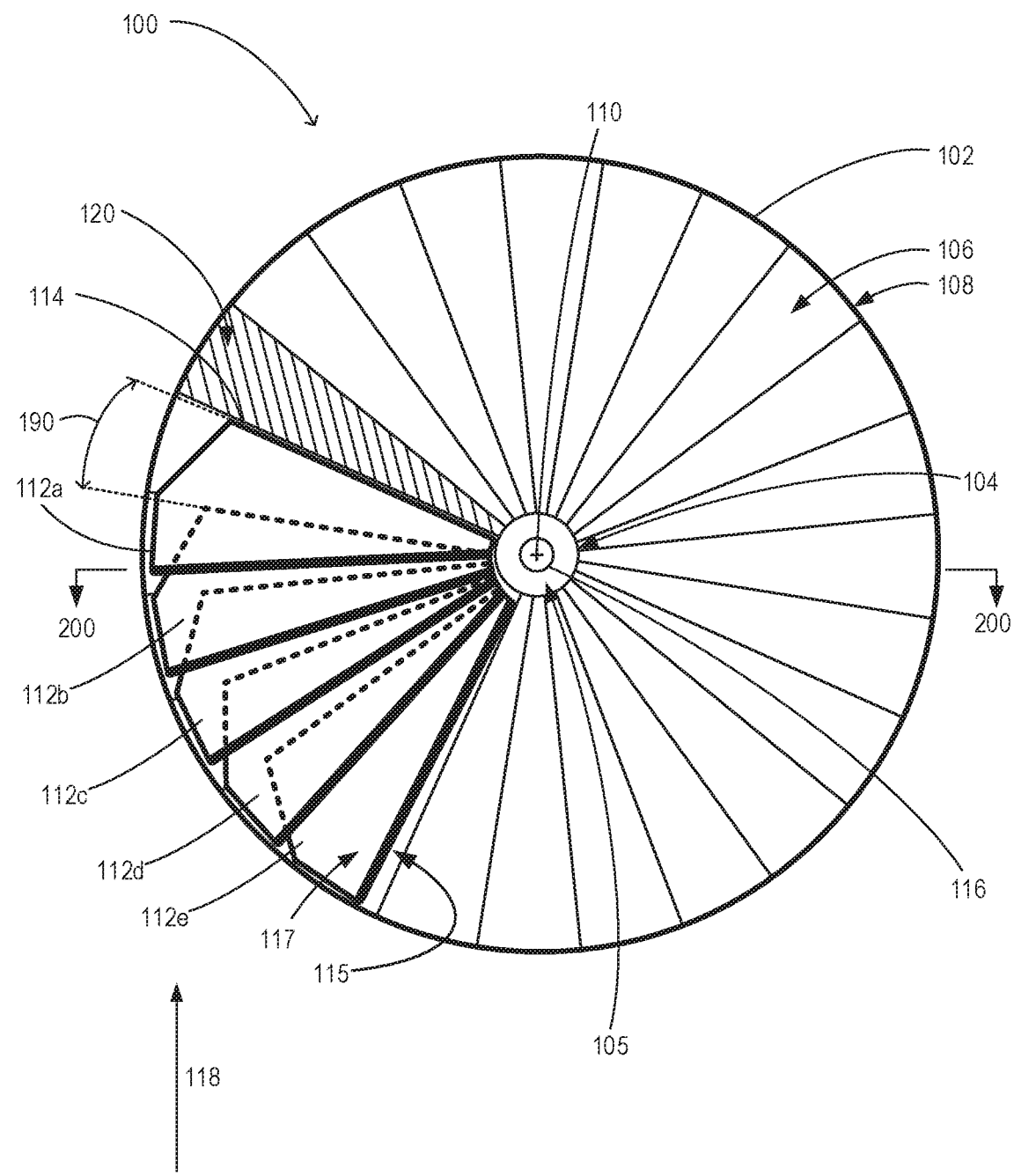
FIG. 1 is a top view of a simplified schematic of an example wind turbine structure.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

Various embodiments of a vertical axis wind turbine and a vertical axis wind turbine rotor are described below. In embodiments described herein, the vertical axis wind turbine rotor may include a rotor base having a rotational centre. The rotational centre may define an axis of rotation about which the rotor can rotate. The vertical axis wind turbine may include a rotor shaft provided at the rotational centre. The rotor shaft can be attached to the rotor base.

The base may be rotatably attached to the rotor shaft to allow the base to rotate about the rotational axis defined by the rotational centre of the base. For example, the base may be in the shape of a cylindrical disk. This may allow rotation of the base to drive rotation of the rotor shaft. The rotor shaft may be used to couple the base to a generator for converting rotational energy from the rotor into electrical energy. In some cases, multiple rotor bases may be stacked above one another and attached to a rotor shaft to increase the amount of energy that can be captured using a single rotor shaft.

The base may include a top or upper surface that extends radially outward from the rotational centre to the edge of the top surface (the top surface edge). The top surface may extend in a direction substantially orthogonal to the axis of rotation defined by the rotational centre. In some cases, the top surface may not extend directly perpendicular to the rotational axis, while still generally extending outward from the rotational centre in a direction substantially orthogonal to the rotation axis. That is, at least a portion the top surface may have a slight downward incline or slope from the rotational centre towards the top surface edge of the base (i.e. the outer edge of the rotor base). This incline or slope may allow rainwater or snow or other environmental debris to run-off the top surface of the base.

A plurality of wind catchment devices can be attached to the base. These wind catchment devices, or plates, may be radially spaced around the rotational centre. The plates can be used to capture wind incident on the vertical axis wind turbine rotor. As used herein, the term "plate" should generally be understood to refer to a wind catchment plate or blade or vane etc. that can be used to capture incident wind energy and propel the rotation of the base (and in turn the rotor shaft). Various types of plates or blades, or vanes, or other wind catchment devices can be used, but the term "plate" will be used herein to refer to these wind catchment devices for consistency and ease of reference.

In some cases, the plurality of plates may include a plurality of top plates positioned radially spaced and attached to the top surface and/or a plurality of bottom plates positioned radially spaced and attached to the bottom surface of the base. Each plate can be coupled to the base along the leading edge of that plate. The leading edge of a plate is so named as it will typically be the portion of the plate leading in the direction of rotation of the disk/base when in use.

In embodiments described herein, the plates may not need to be oriented in the direction of incident wind to capture the kinetic wind energy, unlike with horizontal axis wind turbines. That is, the vertical axis wind turbine rotors may be able to capture kinetic wind energy from wind incident on the plates from different directions. As a result, in embodiments described herein the vertical axis wind turbines may be installed more easily, without the need for wind sensing and/or wind orientation components.

In some embodiments, the plurality of plates (e.g. the plurality of top plates and/or the plurality of bottom plates) may be spaced at substantially equal radial angles around the surface of the base. The spacing of the plates can be determined based on the number, size and geometry of the plates used. Different, numbers, sizes and geometries of plates may be used in different circumstances depending on the conditions of the wind catchment site (e.g. the environmental conditions of the site where the vertical axis wind turbine is to be installed). By providing plates substantially equally spaced around the surface of the disk, the plates may be able to easily capture wind forces incident on the vertical axis wind turbine rotor from many different directions.

Each plate has a wind catchment surface for capturing the kinetic energy of wind incident on the plate. The plates also have a leading surface opposite the wind catchment surface. In general, in order for the rotor to rotate, the wind force incident on the rotor in the direction of rotation (i.e. the portion of kinetic wind energy incident on the wind catchment surface of the plates in the direction of rotation) should be greater than the wind force incident on the rotor in a direction opposite the direction of rotation (i.e. the portion of kinetic wind energy incident on the leading surface of the plates opposite the direction of rotation). Accordingly, the wind catchment surfaces and the leading surfaces of the vertical axis wind turbine rotors described herein may be configured to increase the wind force incident on the rotor in the direction of rotation while decreasing the wind force incident on the rotor in a direction opposite the direction of rotation.

The plates may be coupled to the base so that the wind catchment surface acts in concert with the base to provide a pocket to capture wind. The plates may be arranged so that the leading surfaces have a sloping profile that allows wind to be deflected and pass over the plates when they are in the second phase of rotation while imparting less drag on the plates.

In some embodiments, the plates may be transitionable between a generally open position (an extended or first position) and a generally closed position (a retracted or second position). For instance, the plates may be hingedly or pivotably coupled to the base to allow the plates to rotate between the open position and the closed position. The plates may have a maximum opening angle that provides a substantially triangularly shaped pocket on the wind catchment side, while providing a sloped profile on the leading surface side.

In the generally closed position, a plate may be rotated such that only a small portion (e.g. 10%) the wind catchment surface is exposed above the top surface (or below the bottom surface) of the base. The exposed portion of the wind catchment surface can catch wind incident on the rotor. When wind is incident on the rotor, the wind may act on the exposed portions and move the plate into the generally open position.

When a plate is in the generally open position, the plate may be raised to a maximum rotation angle (opening angle) away from the base (e.g. the top plate may be raised to a maximum angle above the top surface, and a bottom plate may be lowered to a maximum rotation angle below the bottom surface). In the open position, a larger portion, and in some cases substantially all (e.g. 90-95%), of the wind catchment surface of the plate may be exposed to the wind.

In embodiments described herein, the plates may be passively transitionable between the open and closed position. The transition may be passive in the sense that no powered operational components or active control components are necessary to effect the transition of a plate between the open and closed position (or vice versa). That is, the plates may be coupled to the base by simple hinge or other pivotable or rotational couplings without requiring any motors or powered mechanisms to transition the plates between the generally closed and the generally open positions.

Leaving a small portion of the wind catchment surface exposed in the closed position may assist the plates in being passively transitioned from the closed position to the open position. Wind incident on the exposed portion of the wind catchment surface can push the wind catchment plate from the generally closed position to the generally open position. In some cases, the plates may include a curved or raised lip or tip along the trailing edge of the plate. This lip or tip can direct incident wind towards the catchment surface when the plate is in the closed position. The curved/raised tip of the plate may be formed integrally as part of the plate, or may be a separate piece attached to the plate, e.g. along the trailing edge.

Similarly, the plates can also be passively transitioned from the open position to the closed position (e.g. by gravity or a combination of forces such as gravity and wind incident on the leading surface). Allowing the plates to passively transition between the open and closed positions may simplify the design and manufacture of the rotor. This may reduce manufacturing costs, and minimize possible points of failure by avoiding complex mechanical or electronic control systems (e.g. wind sensing/orientation devices, motors for transitioning the plates etc.).

In some embodiments, the base may include a plurality of recesses. The plurality of recesses may include one recess for each of the plurality of plates disposed on the surface of the base. The recesses may allow the wind catchment plates to be recessed below the surface of the base in the generally closed position, with only a small portion of the wind catchment plate extending out of the recess, proud of the surface of the base. As a result, when the plate is moving in a direction opposite the wind direction, only a small drag force may be imparted on the exposed portion of the wind catchment plate. The recesses also allow the plates to provide a larger wind catchment surface to allow more incident wind to be captured by each plate.

In some embodiments, it may be desirable to prevent the wind catchment plates from rotating beyond the maximum rotation angle in the open position. Accordingly, in some embodiments the rotor may include rotation limiters. A rotation limiter may prevent the corresponding plate from rotating beyond the desired maximum angle when transitioning to the open position. The rotor may include a plurality of rotation limiters with one rotation limiter for each of the wind catchment plates. In some cases, the hinged attachment between the plate and the base may be manufactured to prevent over-rotation of the plate beyond the desired maximum angle.

In some cases, each rotation limiter can be coupled between a wind catchment plate and the surface of the base. For example, each plate may include an end portion that extends between an outer/distal edge of the plate (i.e. the edge furthest from the rotational centre) and the top surface (or bottom surface in the case of a bottom plate). The end portion may be sized to define the maximum rotation of the plate in the generally open position. For instance, a textile or fabric end portion may be used. The end portion may be flexible to allow it to fold when the plate is in the closed or lowered position, and then extend to a maximum size (corresponding to the maximum rotation of the plate) in the generally open position. In some cases, other rotation limiters may be used, such as a string extending between the plate and the base. In some embodiments, an upper surface of the recess corresponding to each plate may act as the rotation limiter for that plate. The upper surface of the recess may contact the leading surface of the plate and prevent the plate from rotating beyond the maximum rotation angle. Alternatively, the surface of the base underlying an adjacent plate may contact the plate and prevent over-rotation.

In some embodiments, where bottom plates are provided on the bottom or underside of the base, a lifter may be coupled to each of the plates. In general, the lifter can lift a bottom plate into the generally closed position (and maintain the plate there) when no wind is incident on the rotor. In some cases, the lifters may also define the maximum rotation of the plates in the generally open position (i.e. the lifter and rotation limiter may be a single component). In embodiments described herein, the lifters may also be passive devices, such as springs. The springs may be selected with stiffness sufficient to overcome the force of gravity on the plates while allowing the plates to be lowered when wind is incident on the exposed portions of the platers.

Providing passively transitionable top plates and/or passively transitionable bottom plates may also reduce the weight of the rotor (e.g. no motors are necessary to raise and lower the plates). This may in turn reduce the rotor's resistance to changes in velocity. The rotor may thus exhibit quicker responses to changing wind conditions, shorter spin-up times, and smaller rotational losses than rotors with more heavy, active components. This may result in higher operating efficiencies compared to more complicated designs that may involve complex mechanical or electrical systems for operating rotor blades.

Minimizing the complexity of the rotor may also simplify manufacturing, installation and repair. Avoiding the use of motors and/or electronic control components may reduce potential points of failure for the transitionable wind catchment plates. This may render the rotor more accessible to a wider range of potential users and facilitate wider adoption. As well, a simple design and simpler components may allow the rotor to be more easily customized or modified for particular installation sites or applications. For example, rotors may be manufactured without top plates or without bottom plates depending on the installation site. Similarly, the size and geometry of various features may be adjusted depending on application requirements.

Referring now to FIG. 1, shown therein is a top view of a simplified schematic of example vertical axis wind turbine rotor 100. As shown, rotor 100 includes a base 102 with a rotational centre 104. The rotational centre 104 may define an axis of rotation 110. In the example top view shown in FIG. 1, the axis of rotation 110 extends into and out of plane. That is, the axis of rotation 110 may extend in a direction generally perpendicular to a plane defined by the base 102.

A central rotor shaft 116 may be provided at the rotational centre 104. The base 102 can be rotatably mounted to central rotor shaft 116 at the rotational centre 104. The base 102 can be used to capture incident wind energy that causes the base 102 to rotate about the axis of rotation 110, which can in turn cause the central rotor shaft 116 to rotate about the axis of rotation 110.

In some embodiments, the central rotor shaft 116 can be coupled to an electricity generator to generate electrical power. In some cases, the central rotor shaft 116 may also be used to convert the rotational energy generated by the rotors into mechanical power for operating other devices.

The central rotor shaft 116 may form part of a support structure used to mount the rotor 100 in position to catch wind. The base 102 can be rotatably attached to the central rotor shaft 116 using various fixation methods, such as one or more screws and/or mating connectors provided on the base 102 and central rotor shaft 116 for example. In some cases, multiple bases 102 can be mounted to a central rotor shaft 116 as will be discussed below with reference to FIG. 7.

The base 102 may include an inner shaft region that defines the rotational centre 104. The inner shaft region may provide a bore 105 that allows the central rotor shaft 116 to pass through the rotational centre 104. This may allow multiple rotors 100 to be attached to the same central rotor shaft 116. In some embodiments, the central rotor shaft 116 may extend vertically upward through the bore 105 provided in the base 102. The central rotor shaft 116 may be an extendible rotor shaft, where multiple rotor shaft segments can be added on top of one another, each rotor shaft segment being attachable to one or more rotor bases 102. The extendible rotor shafts may be detachably attachable to one another, e.g. using screws, mating connectors, other fixation methods, or combinations thereof. In some cases, the inner shaft region may include a rotor shaft portion for the rotor 100. In such cases, the central rotor shaft 116 may include the rotor shaft portion provided by rotor 100.

Figure 7:
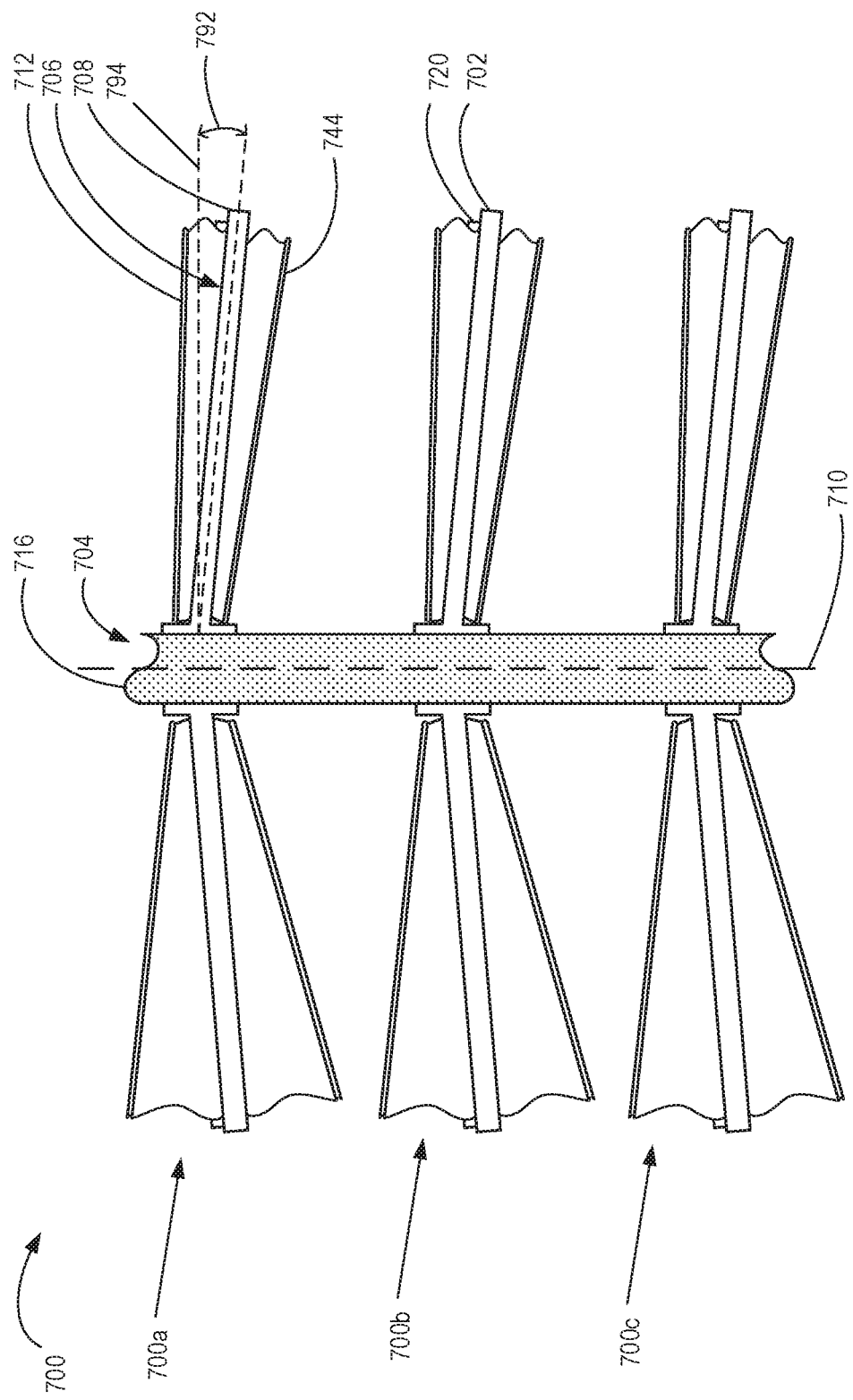
FIG. 7 is a section view of a simplified schematic of an example wind turbine with a plurality of wind turbine structures.

The top view shown in FIG. 1 shows the top surface 106 of the base 102. The top surface 106 extends radially outward from the rotational centre 104 to the top surface edge 108. As shown, the top surface 106 may extend outward from the rotational centre 104 in a direction substantially orthogonal to the rotational axis 110. In some cases, the top surface 106 may include an incline or slope downward from the rotational centre 104 to the top surface edge 108 to allow environmental elements (e.g. rain, sleet, snow, leaves, other debris etc.) to run off the top surface 106, as shown in FIG. 7 discussed below. The rotor 100 may also include other environmental protection features to reduce the impact of environmental debris on the rotor 100. For instance, animal deterrent features, such as wiring or mesh to prevent birds or other animals from landing on or crossing the rotor 100 may be employed.

The rotor 100 can include a plurality of top plates 112 disposed radially around the rotation centre 104. For clarity, only five top plates 112a-112e are shown in the top view of FIG. 1. However, it will be apparent that the number of top plates 112 used with rotor 100 may vary depending on the requirements of a particular turbine application. In general, the top plates 112 may be radially spaced on the top surface 106, e.g. at substantially equally spaced radial angles 190. Other radial arrangements may also be suitable depending on the physical and wind conditions of the installation site.

Each top plate 112 can have a leading edge 114. Generally, the leading edge 114 will effectively lead the plate 112 in the direction of rotation of the rotor 100. Each top plate 112 can be coupled to the base 102 along its leading edge 114. The surface of the plates 112 that leads in the direction of rotation of the base, when wind is incident on the plates 112, may be referred to as the leading surface 117. Opposite the leading surface 117, each plate 112 has a wind catchment surface 115 used to capture the wind incident on the rotor 100.

As the plates 112 rotate around the rotational axis 104, the plates 112 returning against the wind (i.e. those in the second phase of rotation) may encounter resistance i.e. drag from the incident wind on the leading surface 117. This drag force can slow the rotation of the rotor 100, and thereby reduce the net rotational energy that can be captured. This may in turn reduce the mechanical or electrical power that can be generated.

To reduce drag on the rotor 100 when the plates 112 travel against the wind 118, the top plates 112 may be transitionable between a first position in which the top plates 112 extend above the top surface 106 to a first height, and a second position in which the top plates 112 extend above the top surface 106 to a second height. In the second position, the top plates 112 may experience less drag when returning against the wind.

Figure 2:
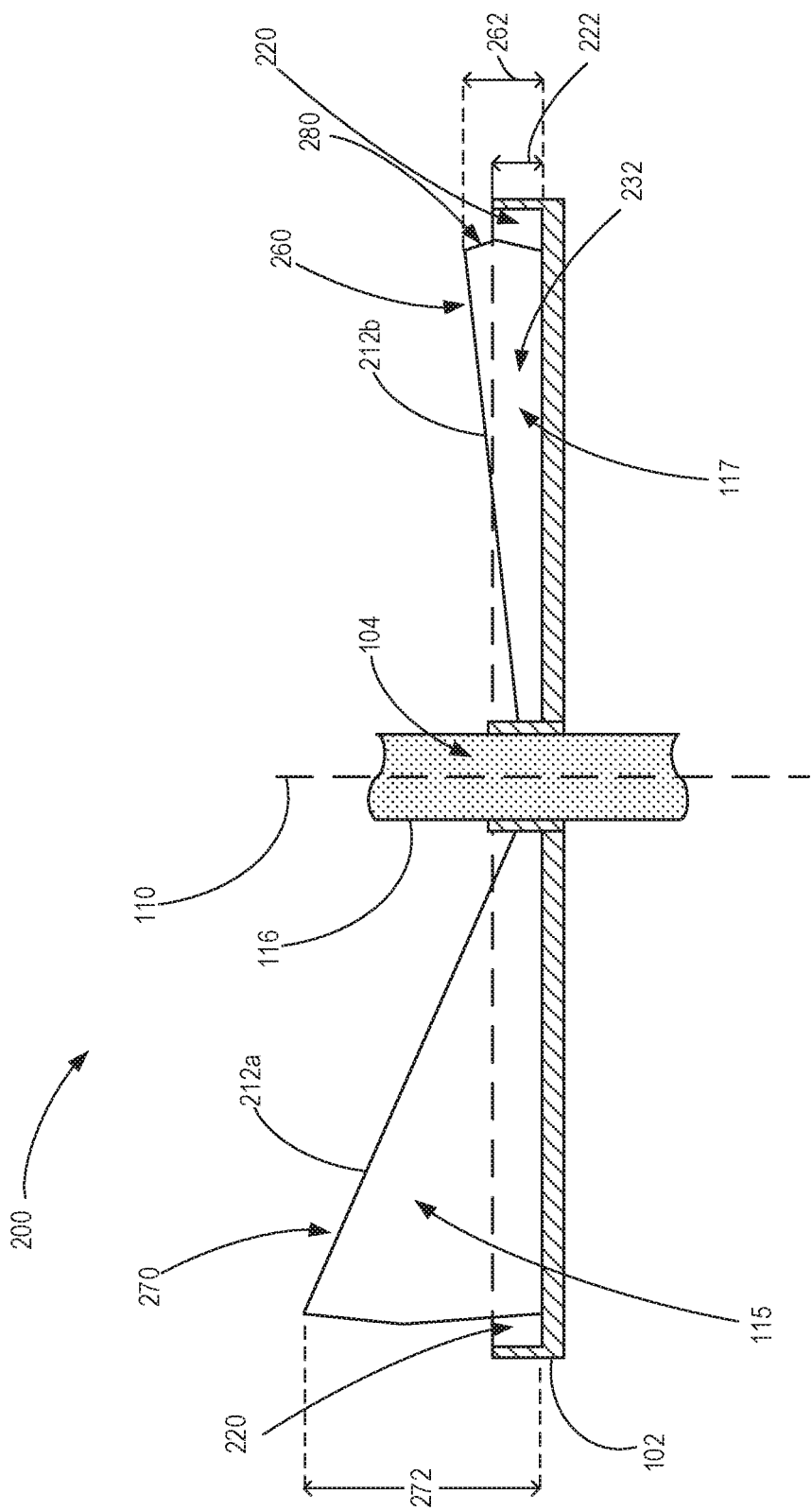
FIG. 2 is section view of a simplified schematic of the example wind turbine structure of FIG. 1.

Referring to FIG. 2, shown therein is a section view of a simplified schematic of the example vertical axis turbine rotor 100 along cross-section 200. Cross-section 200 shows a first plate 212a in the first position 270 and a second plate 212b in the second (or closed) position 260. In general, the section view shown in FIG. 2 may correspond to an installation of rotor 100 with wind incident from direction 118. That is, in this example wind is incident into the page of FIG. 2, and the rotor 100 is configured to rotate clockwise.

In the first position 270, the plate 212a may be raised to a first height 272. Raising the plate 212a to first height 272 may expose a greater portion of the wind catchment surface 115 of plate 212a to the wind incident in direction 118, and allow more kinetic wind energy to be captured. As a result, the wind captured by plate 212a may cause the rotor 100 to rotate in a clockwise direction (in the example shown in FIGS. 1 and 2).

When the plates 112/212 return against the wind 118, the plates may transition to a second position 260. As shown with plate 212b, in the second position 260 the plate 212b may extend above the surface of the base 104 to a second height 262 that is less than the first height 272. As the plate returns against the wind 118, the leading surface 117 is exposed to the incident wind. Because the plate has retracted to the second position 260 less surface area of the leading surface 117 is exposed to the wind 118 than would be the case in the first position 270.

The plates 112 can also be shaped so that the leading surface 117 allows the incident wind to deflect or pass over the plate 212b with minimal kinetic energy being transferred to plate 212b. For instance, the leading surface 117 may be sloped e.g. as shown by plate 312C in FIG. 3a below. As a result, the drag on plate 212b caused by wind incident in direction 118 may be reduced, allowing the base 104 to continue to rotate in the clockwise direction. In different embodiments, the plates 112 and 212 can be configured to rotate the base 104 in either clockwise or counter-clockwise directions as desired.

In some embodiments, the plates 112, 212 may transition passively between the first position and the second position. That is, the rotor 100 may not require any powered mechanical, electrical or electronic components to transition the plates between the first and second positions. The plates 112, 212 may be rotatably coupled to the base and maintainable in the second position 260 by gravity, until the incident wind on the wind catchment surface 115 is sufficient to raise the plate 112, 212 to the first position 270. The plates 112, 212 may then be returned to the second position 260 when the incident wind energy is reduced, or by the incident wind pushing on the leading surface 117 when the plate 112, 212 passes through the second phase of rotation.

In some embodiments, the base 104 may include a plurality of recesses 220. Each top plate 112, 212 may have a recessing portion 232 that can be recessed in a corresponding one of the recesses 220 when the top plate 212 is in the second position. In FIG. 1, an example of a recess footprint 120 is shown. The recess 220 may have various shapes and profiles, examples of which will be discussed below with reference to FIG. 3. The recesses 220 may allow the plates 212 to have a greater wind catchment surface area.

When a plate 212 is substantially recessed in the second position 260, the portion of the leading surface 117 left exposed when returning against the wind 118 may be further minimized. As shown in FIG. 2, the majority of the leading surface may be below the recess height 220, such that the recessing portion 232 of the top plate 212 includes a majority of the leading surface 117.

Figure 3A:
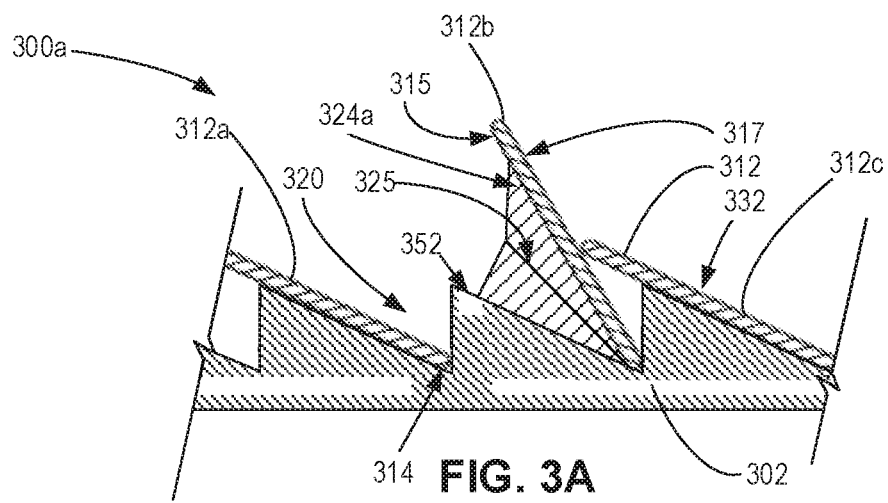
FIG. 3A is partial section view of a simplified schematic of an example wind turbine structure with a first example of a rotation limiter.
Figure 3B:
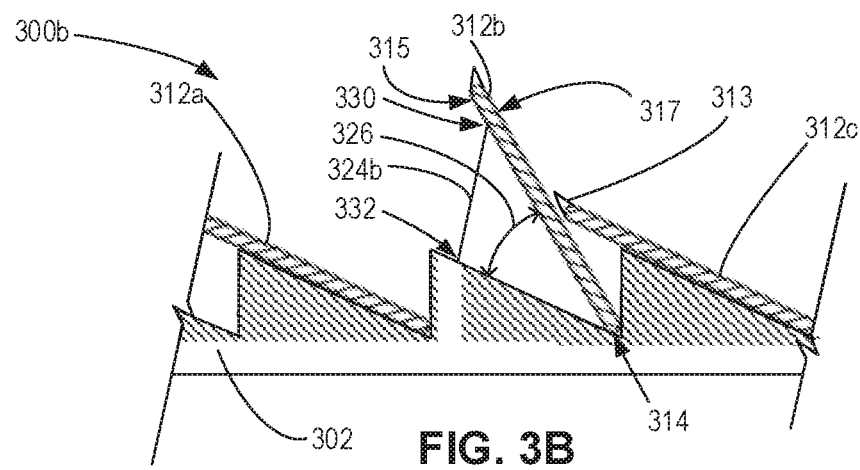
FIG. 3B is partial section view of a simplified schematic of another example wind turbine structure with a second example of a rotation limiter.
Figure 3C:
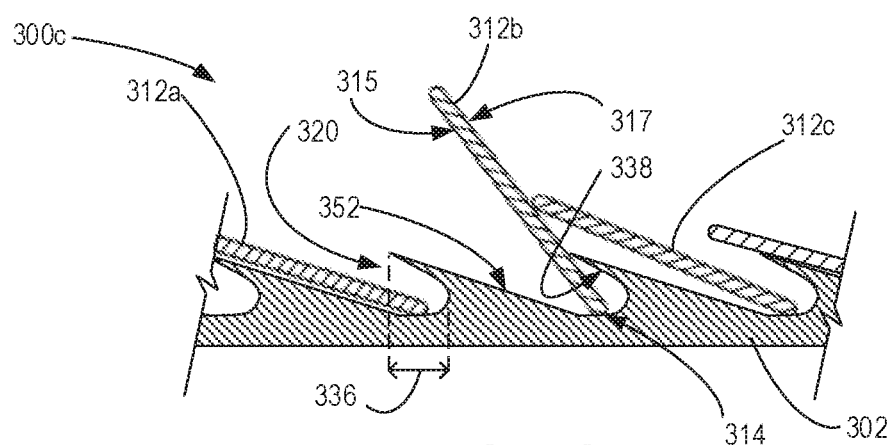
FIG. 3C is partial section view of a simplified schematic of a further example wind turbine structure with a third example of a rotation limiter.

Referring now to FIGS. 3A-3C, shown therein are end views of example simplified schematics 300a-300c of vertical axis wind turbine rotors with various types of recesses 320 and rotation limiters 324.

In FIG. 3A, schematic 300a shows three top plates 312a-312c each coupled along its leading edge to the base 304. The leading edge 314 of each top plate 312a-312c can rest within a recess 320 provided in the base 304. When the top plate 312 is in the second position 260 (i.e. when the top plate 312 is lowered), a recessing portion 332 of the top plate 312 rests within the recess 320. As shown in FIGS. 3A-3C, each top plate 312 may overlie the leading edge 314 of an adjacent top plate 312 when in the second position 260.

Each of the top plates 312a-c has a wind catchment surface 315 and an opposing leading surface 317. When wind is incident on the rotor 300, one or more top plates 312 may catch the wind and may move from the second position 260 toward the first position 270. Top plate 312b is an example of a top plate 312 in the first position 270. Once the rotor 300 rotates to a point where the wind is no longer exerting a force on the wind catchment surface 315 of a top plate 312, the top plate 312 may move back to the second position 270 e.g. due to gravity. This may also occur where the force exerted on the wind catchment surface 315 is insufficient to overcome the force of gravity, or where the top plate 312 is in the second phase of rotation and wind is incident on the leading surface 317.

When a plate 312 is in the second position 270 (as with plates 312a and 312c) a portion 332 of the plate 312 may rest in a recess 320 provided by the base 302. The recess 320 may shelter the recessed portion 332 of the top plate 312 from incident wind to reduce the drag force exerted by the wind on the leading surface 317. In schematic 300a, the recesses 320 have a simple sloped profile. The sloped profile of the recesses 320 may allow the top plates 312 to rest on the resting surface 352 of the recess 320 with a slight slope to allow the incident wind to be deflected off the top plate 312. As well, the slope of the resting surface 352 may define the second height 262 for each corresponding top plate 312.

In some cases, it may be desirable to limit rotation of the top plates 312 when transitioning to the second position 260. Accordingly, in some embodiments the rotor 100 may include a plurality of rotation limiters 324. Each rotation limiter 324 may define a maximum angle of rotation 326 for a corresponding top plate 312 when the top plate 312 is in the first position 270. For instance, the maximum angle of rotation 326 may be defined to be less than 90° from a horizontal plane defined by the base 302 (i.e. to prevent the top plate 312 from rotating to be parallel or beyond parallel with the axis of rotation 110). In some cases, the rotation of the top plates 312 may be limited by the properties of the coupling between the top plates 312 and the base 302. That is, the hinged coupling may have a maximum rotation that defines the maximum angle of rotation 326 for each corresponding top plate 312.

In one embodiment, the rotation limiter 324 may have a first portion 328 and a second portion 330 extending from the first portion 330. Each top plate 312 may have an end portion 280 distal from the rotational centre 204. The first portion 328 of each rotation limiter 324 may be coupled to the end portion 280 of the top plate 312 corresponding to that rotation limiter 324, and the second portion 330 of the rotation limiter 324 may be coupled to the base 302.

In one particular example, as shown in FIG. 3A, the rotation limiter 324a may be a sheet or section of material such as a textile or rubber. In FIG. 3A the rotation limiter 324a can form an end pocket with the top plate 312 to capture wind incident on the rotor 300a. The rotation limiter 324a may also include a crease 325 to facilitate collapsing of the rotation limiter 324a when the plate 312 returns to the second position 260 (i.e. the lowered or recessed position). In some cases, vent holes may be used with the rotation limiter 324a to allow some of the incident air to escape. In another particular example, as shown in FIG. 3B, the rotation limiter 324b may be a string. The string 324b may limit the rotation of top plate 312 to a maximum rotation angle 326 away from the resting surface 352 of the recess 320.

FIG. 3B also illustrates top plates 312b and 312c with extensions 313. As shown in FIG. 3B, the extensions 313 may be a raised or curved lip extension coupled along the trailing edge of the top plates 312. The extensions 313 may serve to direct wind onto the wind catchment surface when the top plates 312 are in the second position 260. As shown in FIG. 3B, the extensions 3B can be formed separately and attached to the trailing edge of the top plates 312. In other embodiments, the extensions 313 may be formed integrally as part of the top plates 312.

The number, shape and size of plates 112, 212, 312 used with rotors 100, 200, and 300 may depend on the size of the base. For instance, for a base that extends approximately 2 feet from the rotational centre to the top surface edge, the plates may extend approximately 2 feet as well from the rotational centre to the top surface edge and may have a distal/outer edge of about 1¾ feet. Depending on the number of plates 112 used with the rotor 100, the length of the end portion of the plate 112 may also be different. In such an example, a recess may be used with a footprint of 2 feet by about 1½ feet. The difference between the first height 272 and the second height 262 may also differ depending on the number and size of plates used. For example, the difference between the first height 272 and the second height 262 may be about 2-3 inches in some cases. In one particular embodiment, a rotor 100 may include twenty top plates 112 (and corresponding recesses) disposed around the rotational centre 104 radially spaced apart by 18° relative to each other.

In some embodiments, as shown in FIG. 3C, the recesses 320 may also overlie one other, e.g. as shown by overlying portion 336. This configuration may permit a larger number of top plates 312 to be coupled onto the rotor 100. A larger number of top plates 312 may be accommodated in this embodiment at the expense of potentially limiting the maximum rotation angle of the top plates 312. The recesses may also permit the larger number of top plates 312 without reducing the size of the wind catchment surface area of each top plate.

As shown in FIG. 3C, the recesses 320 may also include a limiter surface 338 that operates as a rotation limiter for a corresponding top plate 312. The limiter surface 338 of each recess 340 may contact the leading surface 317 of the top plate 312 corresponding to that recess 320 when the top plate 312 transitions to the first position 270.

Referring now to FIG. 4A, shown therein is another example embodiment of vertical axis wind turbine rotor 400. Rotor 400 includes a plurality of top plates 412 coupled to the top surface 406 of base 402. In addition, rotor 400 also includes a plurality of bottom plates 444 coupled to the bottom surface 440 of the rotor 400. Providing bottom plates 444 with rotor 400 may further increase the amount of incident wind energy that can be captured by rotor 400, and thus also increase the energy capture capabilities of the rotor 400.

The bottom surface 440 of rotor 400 may extend radially from the rotational centre 404 to a bottom surface edge 442. The plurality of bottom plates 444 may be disposed radially around the rotational centre 404. Each bottom plate 444 may be coupled to the bottom surface 440 of the base 402 along its leading edge 414. In this configuration, the bottom plates 444 may extend below the bottom surface 440. The bottom plates 444 each have a wind catchment surface 415 and a leading surface 417 that operate similar to the top plates 412.

Each bottom plate 444 may also have a maximum rotation angle away from the base 402. This may ensure that the wind catchment surface 415 in combination with the bottom surface 440 provides a pocket to capture incident wind. As with the top plates 412, the leading surface 417 may have a sloped profile to allow incident wind to be deflect as the bottom plate 444 passes through the second phase of rotation. Accordingly, the overall energy capture ability of the rotor 400 may be increased, even though some drag may be imparted on the bottom plates 444 as they return against the wind.

In some embodiments, the bottom plates 444 may be fixed (non-rotational) relative to the bottom surface 440. In other cases, rotation limiters may be used to restrict the maximum rotation angle of the bottom plates 444.

Referring now FIGS. 5A-B, in some embodiments, the bottom plates 544 may be transitionable between a lowered position 550 in which the bottom plates 544 extend below the bottom surface 540 to a first depth 552, and a raised position 554 in which the bottom plates 544 extend below the bottom surface 540 to a second depth 556. Each bottom plate 544 can be coupled to the base 540 along its leading edge 514. The bottom plates 544 can be coupled to the base 540 so they can transition between the lowered position 550 and the raised position 554, e.g. pivotally or rotationally.

When a bottom plate 544 is in the raised position 554, the force of incident wind along with gravity can act to move the plate 544 into the lowered position 550. To ensure that the bottom plate 544 returns to the raised position 554 when the incident wind energy is reduced or is acting on the leading surface 517 (i.e. when the bottom plate 544 is in the second phase of rotation), a lifter 580 may be used. For instance, each plate 544 may have a corresponding lifter 580 that can act to return the plate 544 to the raised position 554 in the absence of sufficient incident wind on the wind catchment surface 515.

Each lifter 580 may have a first end 582 coupled to the base 540 and a second end 584 coupled to a corresponding bottom plate 544. The lifter 580 may be in tension to hold the bottom plate 544 in the raised position 554 in the absence of an incident wind force, and to raise the bottom plate 544 from the lowered position 550. The lifter 580 may be coupled to the trailing edge 546 of the bottom plate 544. In different embodiments, the lifter 580 may be coupled to the bottom plate 544 at one or more locations between the rotational centre 504 and the distal end 548 of the bottom plate 544.

The lifters 580 may exert a force on their corresponding bottom plates 544 toward the base 504 when the bottom plates 544 are in the lowered position 550. When wind is incident on the wind catchment surface 515 of the bottom plates 544, the kinetic energy from the wind may be sufficient to overcome the force exerted by the lifter 580 and the wind may thereby passively lower the bottom plates 544 into the lowered position 550. When incident wind of a certain minimum strength ("a minimum required wind") is incident on the wind catchment surface 515 of a bottom plate 544, the minimum required wind may move the bottom plate 544 toward the lowered position 550. The minimum strength of wind required to move the bottom plates 544 may be selected, for example, by varying the force exerted by lifters 580. The force exerted by lifters 580 may be selected depending on the expected wind conditions at the installation site.

As the bottom plate 544 rotates out of the first phase of rotation, the kinetic energy from the wind that is incident on the wind catchment surface 515 may decrease and permit the lifter 580 to passively raise the bottom plate 544 to the raised positioned 554. The lifters 580 may hold their corresponding bottom plates 544 in the raised position 554 when no wind is incident on the bottom plates 544.

In some embodiments, the lifters 580 may be a spring, such as a coil spring coupled between the wind catchment surface 515 and/or the trailing edge 546 and the bottom surface 540. The stiffness of the spring may be selected depending on the environmental conditions expected, as well as the weight of the plates 544.

In other embodiments, lifters 580 such as an elastic band may be used. In general, the lifters 580 can passively raise the bottom plate 544 to the raised position 554 in the sense that no electrical power or electronic controls are required for the lifters to operate.

Other types of lifters 580 may also be used to passively raise the bottom plates 544 and hold them in the raised position 554. For example, a lifter 580 may comprise an elongate hollow member and an elongate solid member slidable within the elongate hollow member. A spring may be disposed within the elongate hollow member so as to exert a force tending to pull the solid member into the elongate hollow member. The travel limits of the solid member may be adjustable. The rotational angle of the bottom plates 544 when in the lowered position 554 and when in the raised position 550 may be adjustable by adjusting the travel limits of the solid member. The adjustability may be implemented by, for example, set-screws or by bolts-and-nuts. The set screw, for example, may be received through a slit in the elongate hollow member. The slit may be made along a length of the elongate hollow member. Holes for receiving the screw may be made at intervals and in a wall of the elongate hollow member opposite the slit. The screw may be screwed into one of the holes and thereby serve to limit, for example, the minimum length of the lifter 580. A second screw may be received in the slit and screwed into another one of the holes so as to limit the maximum length of the lifter 580 to which the lifter 580 can be pulled against the force of the spring disposed inside the elongate hollow member.

In some cases, it may be desirable to use a rotor that only includes top plates 512 and/or bottom plates 544. For instance, where a rotor is to be installed below an overhanging structure, bottom plates 544 alone may be desirable. Omitting the top plates 512 may allow a rotor to be installed closer to the underside of the structure. Depending on the conditions at the installation site, such an installation may provide aerodynamic, aesthetic, and space saving benefits. In other cases, using only top plates 512 may simplify construction and minimize points of failure by avoiding the use of lifters 580 while allowing a plurality of rotors with only top plates 512 to be stacked above one another.

Figure 6:
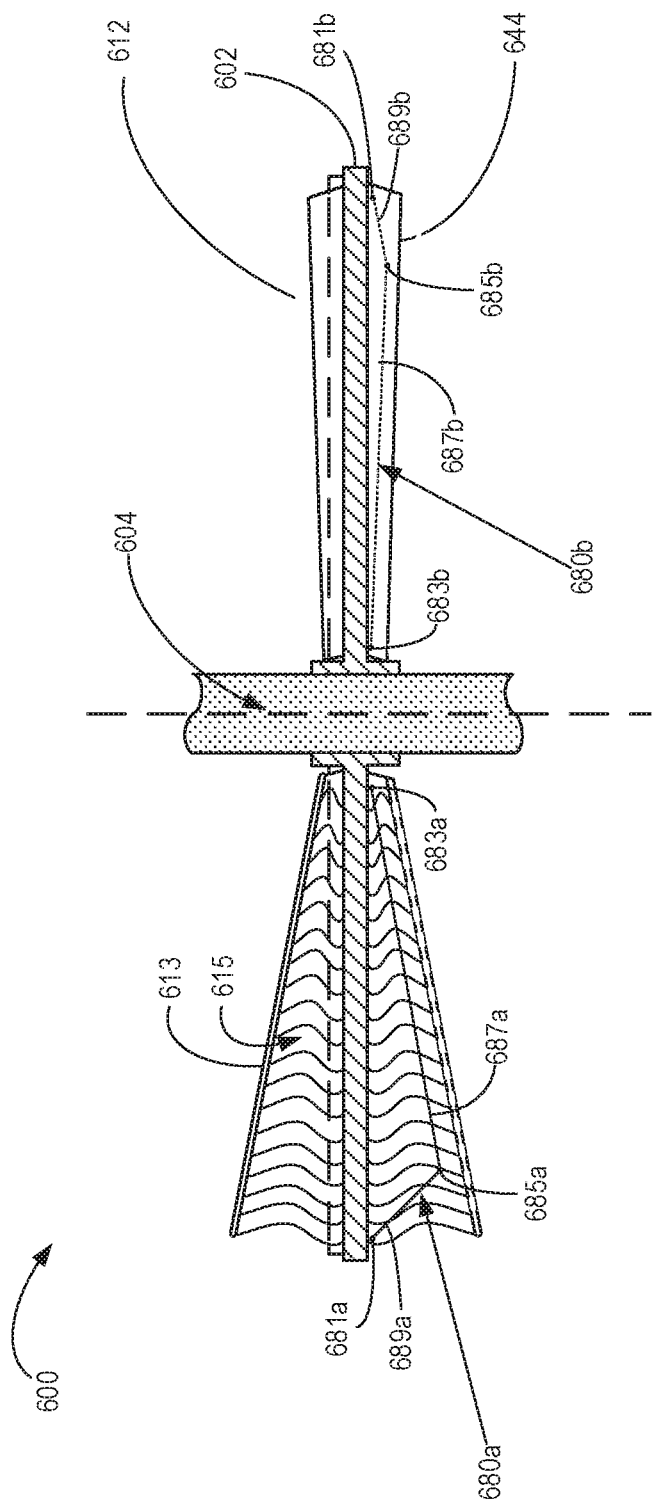
FIG. 6 is a section view of a simplified schematic of yet another example wind turbine structure.

Referring now to FIG. 6, shown therein is another example embodiment of a wind turbine rotor 600. In rotor 600, the bottom plates 644 are coupled to the base 602 using another example embodiment of a lifter 680. The lifters 680 have an outer attachment 681 coupling the lifter 680 to the base 602 near the outer edge of the rotor base 602. The lifters 680 are also coupled to a corresponding bottom plate at an attachment region 685 displaced inwardly form the outer edge of the rotor base 602 by a lifter offset distance. The lifters 680 also include a central attachment 683 coupling the lifter 680 to the base 602 near the rotational center of the base 602. The lifters 680 include a central portion 687 extending from the central attachment 683 to the attachment region 685 and an outer portion 689 extending from the attachment region 685 to the outer attachment 681.

The lifters 680 may be implemented using elastic materials such as an elastic band or spring that holds the bottom plates 644 in the raised position. The stiffness of the lifters 680 can be selected to allow the bottom plates 644 to be lowered when wind is incident on the wind catchment surface. When a bottom plate 644 is in the lowered position, tension in the outer portion 689a of lifter 680a can exert a force on the bottom plate 644 towards the base 602. The central portion 687a will also exert a force on the bottom plate 644 towards the base 602, but because of placement of the attachment region 685 nearer to the outer edge of the base 602 the tension in the outer portion 689 will tend to be greater. As a skilled reader will appreciate, the component of the force exerted on the bottom plate 644 towards the base 602 will depend on the position of the attachment region 685 and the stiffness of the lifter 680, and this may be adjusted depending on various factors such as the size and weight of the rotor 600 and the plates 644, as well as the environmental conditions expected at the installation site. Similarly, the amount of tension in the lifter 680 when in the raised position may be adjusted as desired.

As shown in FIG. 6, the bottom plates 644 can also include extensions 613 for directing the wind to the wind catchment surface 615. This may assist in transitioning the bottom plates 644 from the raised position to the lowered position. In the raised position, the lifters 680*b* may be in a more relaxed state, or a state of lesser tension so that incident wind is transition the bottom plates 644 to the lowered position.

In embodiments described herein, the rotors may use rigid single-piece plates manufactured by, for example, injection molding or 3D printing plastic. In some cases, the base and plates may be manufactured using the same injection molding process with the plates coupled to the base using a plastic or living hinge. In other circumstances, e.g. depending on expected wind conditions or manufacturing considerations, it may be beneficial to manufacture the plates at least partially from a flexible material.

In some embodiments the plates may be formed using one or more frame members along edges of the plates. A flexible material may be attached to the one or more frame members to form the wind catchment surfaces. The flexible material may be chosen, for example, from the group consisting of: vinyls, leatherettes, polyethylene, and textiles. Other materials may also be suitable. The one or more frame members may be individually injection molded or 3D printed using, for example, a plastic. It should be noted that in such examples the one or more frame members may need to be rotationally or pivotally coupled to each other and/or to the base in order to be transitionable between the first position and the second position and the lowered position and the raised position, respectively.

In choosing any particular combination of the materials and geometries described above, it may be necessary to ensure that the combination will provide sufficient sturdiness of the rotor for the wind conditions for which the rotor may be used. For instance, in sites expecting higher winds, heavier and sturdier materials may be used. In other cases, it may be preferred to keep the rotor as light as possible and the wind catchments and secondary wind catchments as small as possible to minimize inertial effects.

Reference is now made to FIG. 7. A vertical axis wind turbine 700*a* having three rotors 700*a*-700*c* fixedly mounted to a central shaft 716 is shown. The rotational centre 704 of the central shaft 716 defines the axis of rotation 710 of the central shaft 716. Each rotor 700*a*-700*c* is rotatably mounted to the central shaft 716 and is rotatable about the axis of rotation 710 to drive rotation of the central shaft 716.

In the example embodiment shown in FIG. 7, each rotor 700*a*-700*c* includes a plurality of top plates 712 and bottom plates 744. As mentioned above, the top surface 706 of rotor 700*a* can be sloped downward from rotational centre 704 to the top surface edge 708. The downward slope 792 of the top surface 706 may be defined relative to a horizontal plane 794 orthogonal to the axis of rotation 710. A sloped top surface 706 may improve environmental runoff (e.g. rain, snow, leaves etc.) from the rotors 700*a*-700*c*. For instance, the inventors have found that a slope of approximately ten degrees downward relative to the horizontal plane 794 may be used. The vertical axis wind turbine 700 may be installed onto any suitable structure—for example, onto the roof of a building, or even the top of a light pole.

The rotors 700 are not restricted to using any particular plate geometry. The rotors 700 are also not restricted to requiring the same number of bottom plates 712 as the top plates 744. Different combinations of plate geometries, quantities of plates 712, 744 per rotor 700, as well as quantities of rotors 700*a-c* per vertical axis wind turbine 700 may be desirable, depending on the expected wind conditions at the installation site.

For example, in a particular implementation example the vertical axis wind turbine 700*a* may include 12 rotors or more stacked above one another. Each rotor may include both top and bottom plates, with 36 plates coupled to the top surface and 36 plates coupled to the bottom surface. Accordingly, each rotor may include a total of 72 wind catchment plates. Each plate may be shaped to have approximately 3 square feet (approximately ¼-⅓ square metres) of surface area on its wind catchment surface. Accordingly, the vertical axis wind turbine 700*a* may provide greater than 200 square metres of wind catchment surface area in a compact deployment.

The rotors 700*a-c* and the vertical axis wind turbine 700 may be manufactured and assembled using any suitable combination of known methods and materials. The top plates may be coupled to the base rotationally (e.g. using a hinge) in order to transition between the first and second position. The bottom plates may be coupled to the base either fixedly or rotationally, depending on whether the bottom plates are to be stationary or transitionable. In embodiments where the bottom plates are to be stationary, the bottom plates 712*b* may be fixedly coupled to the base 702 using, for example, gluing or welding. In some embodiments, the plates may be coupled to the base using, for example, one or more of or a combination of hinges, springs, or flexible materials. In one example, the plates may also be coupled to the base along a textile end portion. A rectangular piece of a textile may be, for example, glued or stapled along the outer edge of the plates and to the base.

As mentioned above, the plates may be injection molded or 3D printed from a plastic. In cases where the bottom plates are stationary, the base along with the bottom plates may be injection molded or 3D printed as a single structure. The plates, the base, and the rotational shaft may be manufactured from a plastic, carbon fibre, and other similar light weight and sturdy materials. The rotational shaft may, for example, be glued or welded to the base or may be injection molded or 3D printed with the base as a single structure. The base may be fixedly or detachably coupled to the central shaft using screws, nuts-and-bolts, welds, or other suitable methods. The recesses may be manufactured in the base as part of the injection moulding, 3D printing, or other suitable processes. The lifters and the rotation limiters may be coupled to the base using glue, hinges, welds, hook-and-loop methods, staples, and other suitable methods.

Figure 8A:
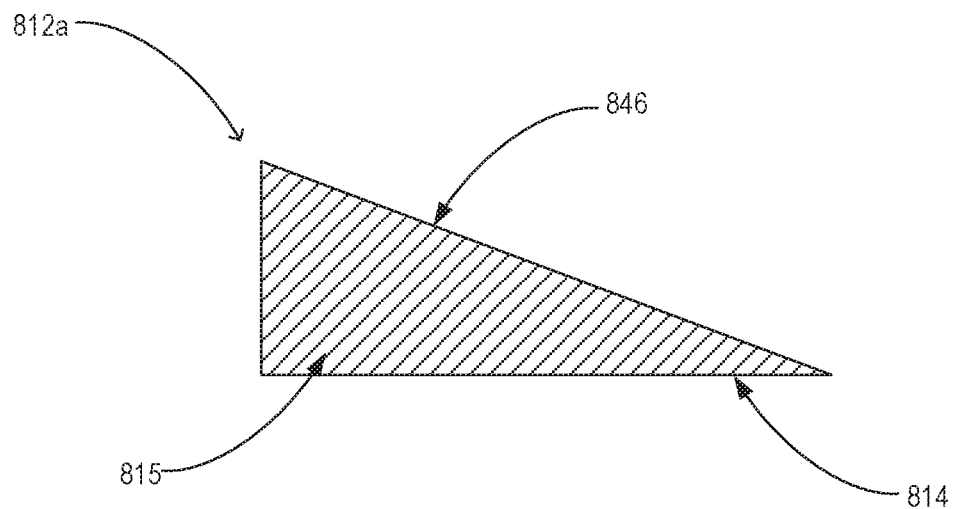
FIG. 8A is an isolation view of an example of a catchment device that may be used with the wind turbine structures of FIG. 1, FIG. 3A-3C, FIG. 4A, FIG. 5A, or FIG. 6 in accordance with an example embodiment.
Figure 8B:
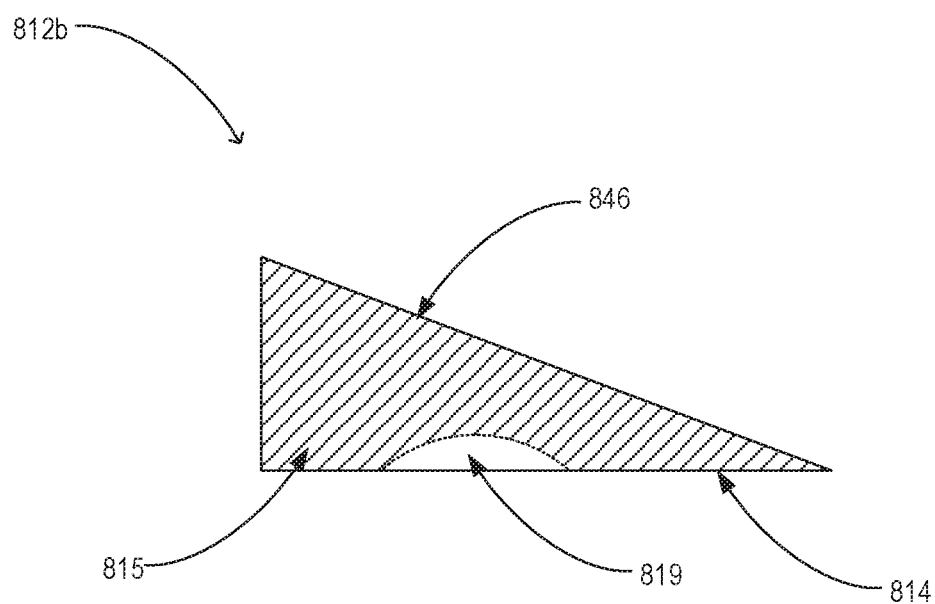
FIG. 8B is an isolation view of an example of an alternative catchment device that may be used with the wind turbine structures of FIG. 1, FIG. 3A-3C, FIG. 4A, FIG. 5A, or FIG. 6, in accordance with an example embodiment.

Referring now to FIGS. 8A and 8B, shown therein are examples of wind catchment plates that may be used in embodiments described herein. FIG. 8A shows an example of a wind catchment plate 812*a* that is generally triangularly-shaped. FIG. 8A shows the wind catchment surface 815 of plate 812*a* that extends generally continuously from the leading edge 814 to the trailing edge 846. Plate 812*a* may be used to implement top plates 112, 212, 312, 412, 512, 612 or 712 in various embodiments. Additionally or alternatively, the plate 812*a* may be used to implement bottom plates 444, 544, 644 or 744.

FIG. 8B shows an example of an alternative wind catchment plate 812*b*. Wind catchment plate 812*b* is generally similar to wind catchment plate 812*a*, with the addition of one or more gaps or windows 819. The wind catchment plate 812*b* includes a window 819 that is substantially void to allow a portion of the incident wind to pass through the plate 812*b*. This allows incident wind to flow through and contact the subsequent wind catchment plates 812*b* on a turbine. For example, referring to FIG. 1, some of the wind 118 incident on the plate 112*e* would be allowed to pass through the wind catchment surface 815 and contact the plate 112*d*. This may provide an increase in the wind catchment surface area that is usable at any time. As a result, the rotational energy captured by the turbine may be increased.

As shown in FIG. 8B, the window 819 is provided immediately adjacent to the leading edge 814. Alternatively, the window 819 may be offset from the leading edge 814. Alternatively, the window 819 may be provided as a gap in the leading edge 814 of the plate 812*b*. Providing the window 819 immediately adjacent to the leading edge 814 or as a gap in the leading edge 814 may ensure that the incident wind is forced to contact the catchment surface 815 before passing through the plate 812*b*.

Although window 819 is shown as a semi-circular window, it will be apparent to those skilled in the art that other shapes may be used, such as rectangular windows. It will also be apparent to those skilled in the art, that the position of the window 819 may also be adjusted between the centre of the turbine and the end portion of the plate 812*b* distal from the rotational centre.

Plate 812*b* may be used to implement top plates 112, 212, 312, 412, 512, 612 or 712 in various embodiments. Additionally or alternatively, the plate 812*b* may be used to implement bottom plates 444, 544, 644 or 744.

A number of embodiments have been described herein. However, it will be understood by persons skilled in the art that other variants and modifications may be made without departing from the scope of the embodiments as defined in the claims appended hereto. A person skilled in the art will also recognize that the embodiments described above should be read as representative of a plethora of permutations not explicitly described, said permutations incorporating elements from various embodiments.

The invention claimed is:

1. A vertical axis turbine rotor comprising:
   a base having a rotational center, a top surface, a top surface edge, and a plurality of top plates disposed radially around the rotational center;
   the top surface extending radially from the rotational center to the top surface edge;
   the rotational center defining an axis of rotation substantially orthogonal to the top surface;
   each top plate having a leading edge and being coupled to the base along the leading edge; and
   each top plate being transitionable between
      a first position in which the top plate extends above the top surface to a first height; and
      a second position in which the top plate extends above the top surface to a second height, the second height being less than the first height;
   wherein
   the base further comprises a plurality of recesses, wherein each of the plurality of recesses has a sloped profile that slopes upwardly from a forward portion of the recess to a rearward portion of the recess; and
   each of the top plates comprises a recessing portion, wherein the recessing portion is recessed in one of the recesses when the top plate is in the second position and at least a portion of the recessing portion extends above the one of the recesses when the top plate is in the first position.

2. The rotor of claim 1, further comprising a plurality of rotation limiters, each rotation limiter corresponding to one of the top plates and defining a maximum height for the first height of the corresponding top plate when the corresponding top plate is in the first position.

3. The rotor of claim 2, wherein each top plate has an end portion distal from the rotational center, the end portion coupled to the top surface, and the rotation limiter comprises the end portion.

4. The rotor of claim 2, wherein each rotation limiter is a textile that includes a crease to facilitate collapsing of each rotation limiter when the corresponding top plate returns to the second position.

5. The rotor of claim 2, wherein each rotation limiter is a string.

6. The rotor of claim 2, wherein:
   each of the recesses has a limiter surface; and
   for each top plate, the rotation limiter corresponding to that top plate comprises the limiter surface of a recess adjacent to the recess into which the recessing portion of that top plate is recessed when the top plate is in the second position, the limiter surface positioned to contact that top plate when that top plate is in the first position to prevent the top plate from transitioning beyond the maximum height.

7. The rotor of claim 1, wherein each top plate overlies the leading edge of an adjacent top plate when in the second position.

8. The rotor of claim 1, wherein each top plate is passively transitionable between the first position and the second position.

9. The rotor of claim 1, wherein:
   the base has a bottom surface, a bottom surface edge, and a plurality of bottom plates disposed radially around the rotational center;
   the bottom surface extends radially from the rotational center to the bottom surface edge; and
   each bottom plate has a bottom leading edge and is coupled along the leading edge to the base.

10. The rotor of claim 9, wherein each of the bottom plates is transitionable between:
   a lowered position in which the bottom plate extends below the bottom surface to a first depth; and
   a raised position in which the bottom plate extends below the bottom surface to a second depth, the second depth being less than the first depth.

11. The rotor of claim 10, further comprising:
   a plurality of lifters, each lifter corresponding to one of the bottom plates; and
   each lifter being coupled to the base and to the bottom plate corresponding to that lifter; wherein
   each bottom plate is maintainable in the raised position by the corresponding lifter.

12. The rotor of claim 11, wherein:
   each of the bottom plates has a trailing edge;
   each lifter is coupled to the base at a central attachment region and at an outer attachment region proximate the bottom surface edge; and
   each lifter is coupled to the bottom plate corresponding to that lifter at a lifter attachment region between the central attachment region and the outer attachment region, the lifter attachment region displaced inwardly from the outer attachment region.

13. The rotor of claim 12, wherein each lifter is a spring.

14. The rotor of claim 13, wherein the spring has a selected stiffness, the stiffness selected such that, when the rotor is positioned with the bottom surface in a downward facing orientation, fluid incident upon one of the bottom plates will transition the bottom plate from the raised position to the lowered position.

15. The rotor of claim 14, wherein the stiffness is selected such that, when the rotor is positioned with the second surface in the downward facing orientation, the lower plate is returned by the spring to the raised position in the absence of incident fluid.

16. The rotor of claim 10, wherein each of the bottom plates is passively transitionable between the lowered position and the raised position.

17. A vertical axis turbine comprising a central shaft and a plurality of rotors coupled to the central shaft, wherein each rotor is defined according to claim 1.

18. The rotor of claim 1, wherein the base further comprises a plurality of openings, wherein each opening is associated with one of the top plates, and each opening defines an aperture that permits fluid to flow therethrough.

19. A vertical axis turbine rotor comprising:
a base having a rotational center, a top surface, a top surface edge, and a plurality of top plates disposed radially around the rotational center;
the top surface extending radially from the rotational center to the top surface edge;
the rotational center defining an axis of rotation substantially orthogonal to the top surface;
each top plate having a leading edge and being coupled to the base along the leading edge; and
each top plate being transitionable between:
a first position in which the top plate extends above the top surface to a first height; and
a second position in which the top plate extends above the top surface to a second height, the second height being less than the first height;
wherein each top plate further comprises at least one window that is substantially void to permit fluid to flow therethrough, the at least one window being located immediately adjacent the leading edge of the top plate and not offset from the leading edge of the top plate, or provided as a gap in the leading edge of the top plate.

20. A vertical axis turbine rotor comprising:
a base having a rotational center, a top surface, a top surface edge, and a plurality of top plates disposed above the top surface and radially around the rotational center;
the top surface extending radially from the rotational center to the top surface edge;
the rotational center defining an axis of rotation substantially orthogonal to the top surface;
each top plate having a leading edge and a trailing edge and being coupled to the base along the leading edge; and
each top plate being transitionable between
a first position in which the top plate extends above the top surface to a first height; and
a second position in which the top plate extends above the top surface to a second height, the second height being less than the first height;
wherein the trailing edge of each top plate overlies the leading edge of an adjacent top plate of the plurality of top plates when in the second position.

* * * * *